(12) United States Patent
Zobell et al.

(10) Patent No.: US 11,250,555 B2
(45) Date of Patent: Feb. 15, 2022

(54) DATA ACQUISITION FOR LIQUID COMPOSITE MOLDING

(71) Applicant: Brigham Young University, Provo, UT (US)

(72) Inventors: Brock Zobell, Provo, UT (US); Caleb Lystrup, Provo, UT (US); Kim Stevens, Provo, UT (US); Andy George, Provo, UT (US); Razmik Boodaghians, Glendale, CA (US)

(73) Assignee: Brigham Young University, Provo, UT (US)

( * ) Notice: Subject to any disclaimer, the term of this patent is extended or adjusted under 35 U.S.C. 154(b) by 42 days.

(21) Appl. No.: 16/677,566

(22) Filed: Nov. 7, 2019

(65) Prior Publication Data

US 2020/0143530 A1 May 7, 2020

Related U.S. Application Data

(60) Provisional application No. 62/757,067, filed on Nov. 7, 2018.

(51) Int. Cl.
*B29C 70/06* (2006.01)
*G06T 7/00* (2017.01)

(52) U.S. Cl.
CPC ............ *G06T 7/0008* (2013.01); *B29C 70/06* (2013.01); *G06T 2207/20024* (2013.01)

(58) Field of Classification Search
None
See application file for complete search history.

(56) References Cited

U.S. PATENT DOCUMENTS

2017/0316487 A1* 11/2017 Mazed .................. G06Q 30/02
2018/0105488 A1*  4/2018 Katagiri ................ C08G 61/02
2020/0143530 A1*  5/2020 Zobell .................... B29C 70/06

OTHER PUBLICATIONS

Carlone et al., "Unsaturated and Saturated Flow Front Tracking in Liquid Composite Molding Processes using Dielectric Sensors," Appl Compos Mater (2015) 22:543-557 (Year: 2015).*
Diallo et al., "Experimental Analysis and Simulation of Flow Through Multi-layer Fiber Reinforcements in Liquid Composite Molding," Polymer Composites, Jun. 1998, vol. 19, No. 3 (Year: 1998).*

(Continued)

*Primary Examiner* — Soo Shin
(74) *Attorney, Agent, or Firm* — Kunzler Bean & Adamson (57) ABSTRACT

A method for in-situ data acquisition comprises providing a mold, wherein at least a portion of the mold is transparent, inserting a liquid composite molding reinforcement into a cavity of the mold, injecting a fluid into the cavity of the mold, the fluid comprising a fluorescent dye, lighting the mold with an ultraviolet lighting source and capturing a plurality of images of a front portion of the fluid as the fluid advances within the cavity of the mold. Capturing the plurality of images of a front portion of the fluid may include advancing a camera along a camera track as the fluid advances within the cavity of the mold. A corresponding method and computer program product for processing images captured by the above method are also disclosed herein.

20 Claims, 6 Drawing Sheets

(56) References Cited

OTHER PUBLICATIONS

Park et al., "Modeling void formation and unsaturated flow in liquid composite molding processes: a survey and review," Journal of Reinforced Plastics and Composites 30(11) 957-977, 2011 (Year: 2011).*

KM Pillai, "Modeling the Unsaturated Flow in Liquid Composite Molding Processes: A Review and Some Thoughts," Journal of Composite Materials, vol. 38, No. 23/2004 2097 (Year: 2004).*

* cited by examiner

DATA ACQUISITION FOR LIQUID COMPOSITE MOLDING

BACKGROUND

The subject matter disclosed herein relates generally to characterizing liquid composite molding processes and particularly to in-situ data acquisition of liquid composite molding processes.

Liquid composite molding (LCM) is growing in importance as a method of manufacturing high-performance composites. However, sub-optimal fluid flow and bubble formation can significantly limit or reduce the mechanical properties (i.e. strength, stiffness, fracture toughness, etc.) of composites made via LCM and remains an impediment to increased adoption of LCM processes.

SUMMARY OF THE INVENTION

A method for in-situ data acquisition includes providing a mold, wherein at least a portion of the mold is transparent, inserting a liquid composite molding reinforcement into a cavity of the mold, injecting a fluid into the cavity of the mold, the fluid comprising a fluorescent dye, lighting the mold with an ultraviolet lighting source and capturing a plurality of images of a front portion of the fluid as the fluid advances within the cavity of the mold. Capturing the plurality of images of a front portion of the fluid may include advancing a camera along a camera track as the fluid advances within the cavity of the mold.

A corresponding method and computer program product for processing images captured by the above method are also disclosed herein. Processing the captured images may include a variety of steps/operations such as applying a green filter, binarization, grouping adjacent binary pixels having a common value to produce pixel groups, filtering/sorting the pixel groups according to size, filtering out pixel groups that have a selected orientation range (e.g., that corresponds to a fiber orientation for the liquid composite molding reinforcement) and/or that have an aspect ratio that is greater than a selected ratio, filtering out high entropy regions and measuring bubble related information from the remaining pixel groups.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

One of ordinary skill in the art will appreciate that references throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Figure 1A:
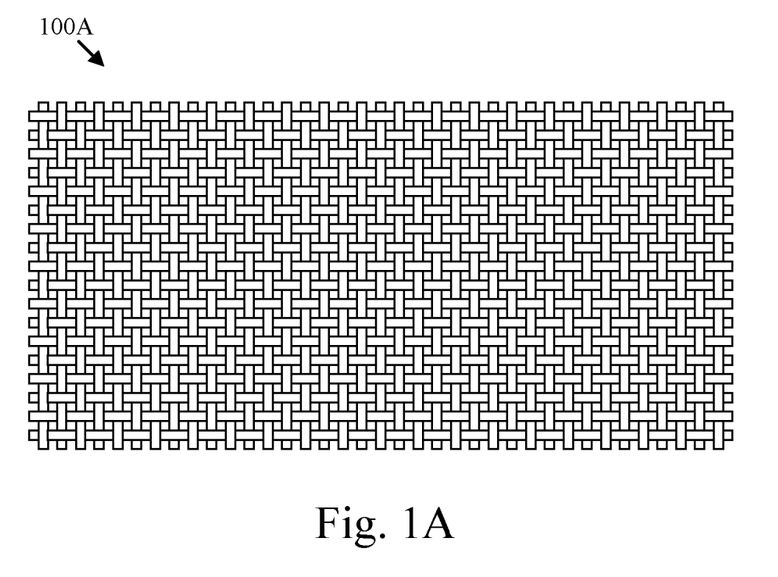
FIGS. 1A and 1B are respective top and side view drawings of two examples of an LCM pre-form in accordance with at least one embodiment disclosed herein.
Figure 1B:
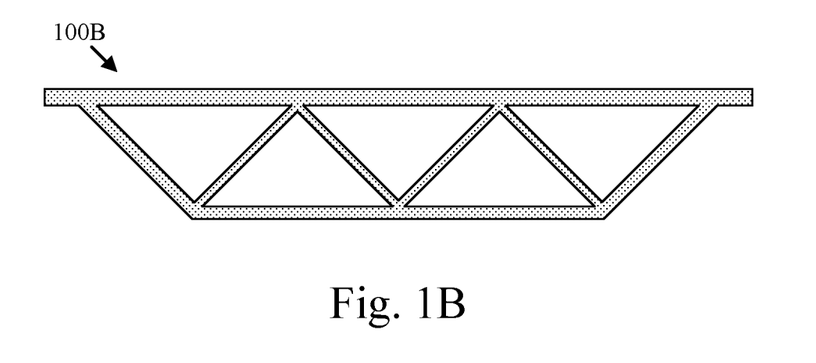

FIGS. 1A and 1B are respective top and side view drawings of two examples of an LCM pre-form in accordance with at least one embodiment disclosed herein. The LCM pre-form 100 may comprise fibers strands (e.g., carbon fiber) which in some embodiments are bundled, woven or wound into a shape corresponding to an LCM product. In the embodiment depicted in FIG. 1B, the LCM pre-form 100B corresponds to a truss.

Figure 2A:
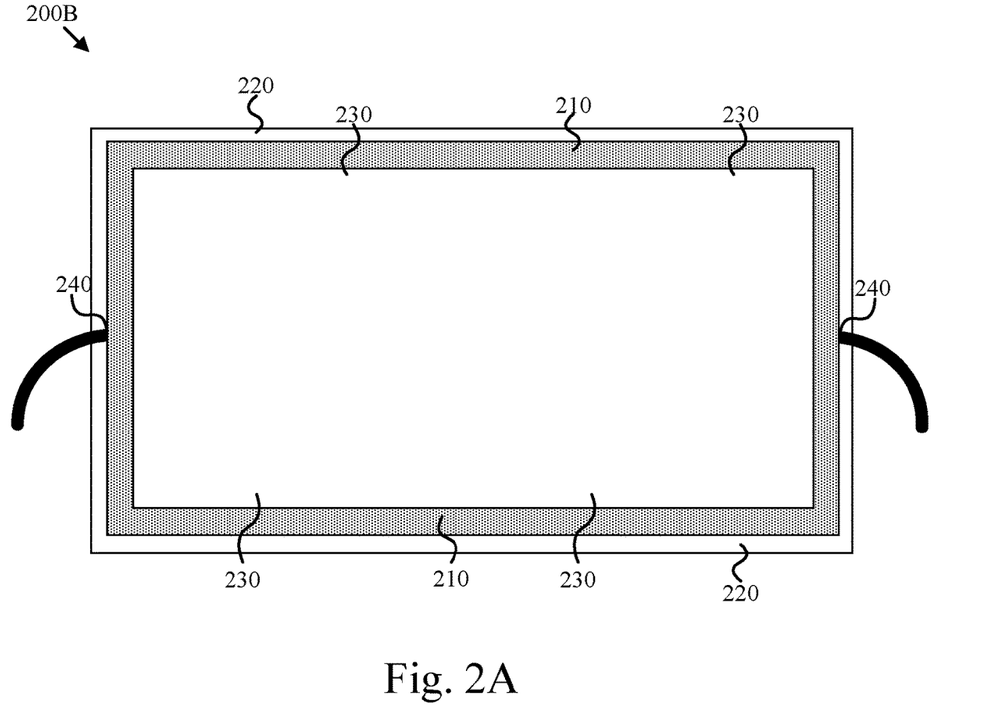
FIGS. 2A and 2B are top view drawings and FIG. 2C is an exploded cross-sectional side view drawing of two examples of a liquid composite mold corresponding to the LCM pre-forms depicted in FIGS. 1A and 1B.
Figure 2B:
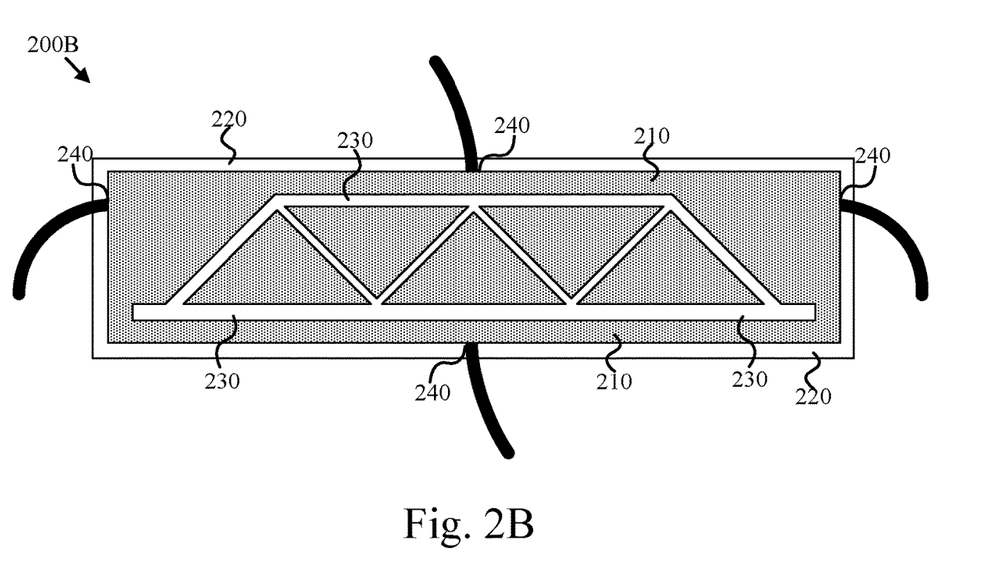
Figure 2C:
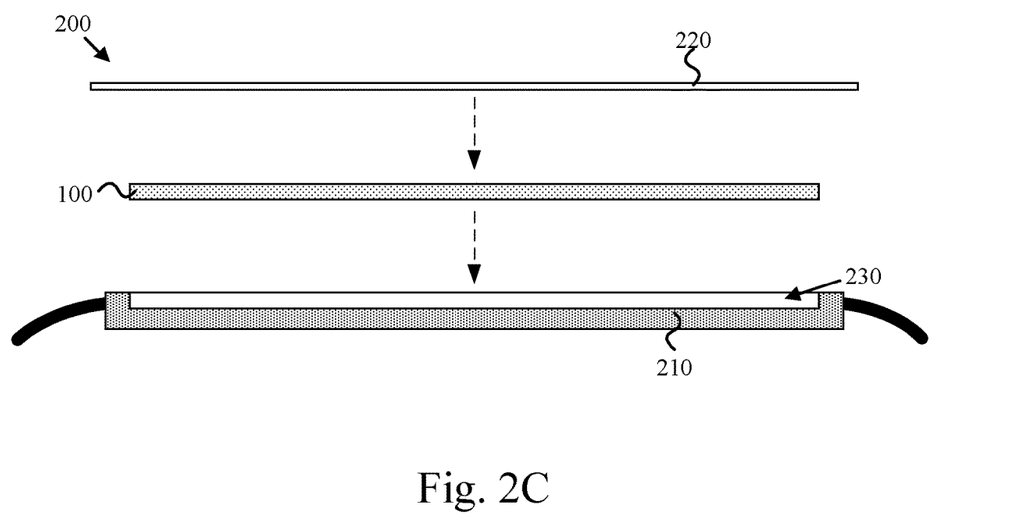

FIGS. 2A and 2B are top view drawings and FIG. 2C is an exploded cross-sectional side view drawing of two examples of a liquid composite mold corresponding to the LCM pre-forms depicted in FIGS. 1A and 1B. In the depicted embodiments, the liquid composite mold 200 includes a body portion 210 and a cover portion 220 that are joined together to form a cavity 230 into which the corresponding LCM pre-form 100 is placed. In other embodiments, the liquid composite mold 200 may have multiple body portions 210 (with or without a cover portion 220) that are joined together to form the liquid composite mold 200.

The LCM pre-form 100 may be placed within the cavity 230 and the elements of the mold 200 may be joined together to enable insertion of a fluid (not shown) into the cavity. The fluid may be a solidifying resin used to manufacture the LCM product or a non-solidifying fluid used to simulate a resin used to manufacture the LCM product. Consequently, the mold 200 may be used for research purposes or manufacturing purposes.

The mold 200 may have one or more ports 240 and various internal passages (not shown) that enable the insertion and extraction of the fluid, into and from, the cavity 230. At least a portion of the mold 200 may be transparent to enable the capture of images as fluid flows in the cavity and around the LCM pre-form 100 as well as between the fibers of the LCM pre-form 100. The captured images may be used to detect bubble formation and extract fluid and bubble related information. In the depicted embodiment, the cover portion 220 is a transparent plate such as an acrylic or glass plate that enables capturing the images with one or more cameras.

Figure 3A:
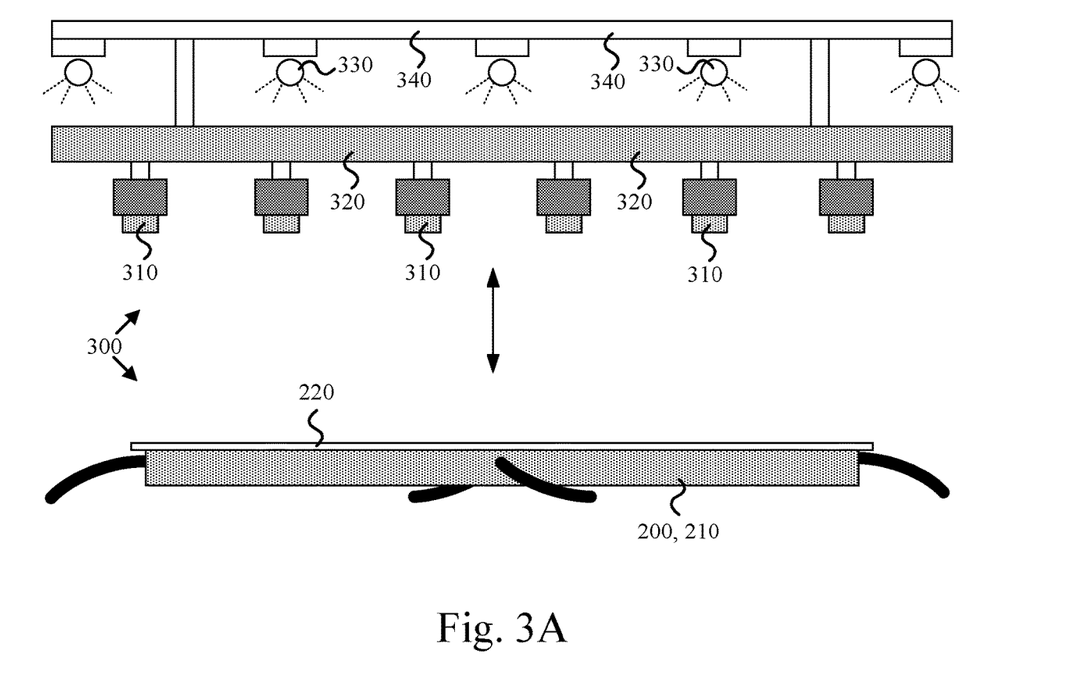
FIGS. 3A and 3B are side view drawings of selected portions of an in-situ data acquisition system in accordance with at least one embodiment disclosed herein.
Figure 3B:
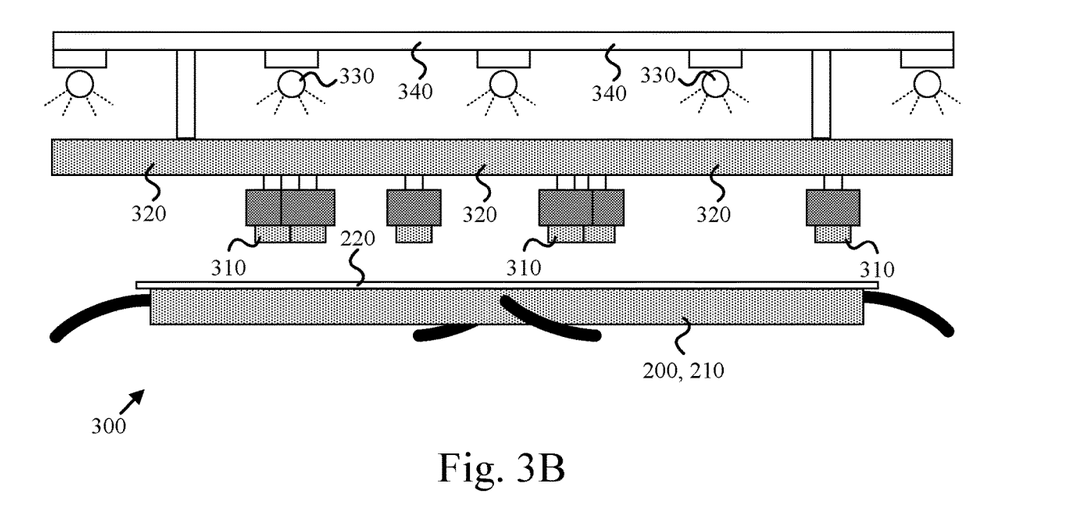

FIGS. 3A and 3B are side view drawing of selected portions of an in-situ data acquisition system 300 in accordance with at least one embodiment disclosed herein. As depicted, the in-situ data acquisition system 300 includes one or more cameras 310 mounted on a camera movement platform 320. The depicted in-situ data acquisition system 300 also includes one or more light sources 330 mounted on a lighting platform 340.

The cameras 310 may be guided along camera tracks (not shown) that enable the one or more cameras 310 to track movement of one or more fluid fronts (not shown) within the cavity 230 of the mold 200. The camera tracks may correspond to legs or other elements of the LCM pre-form 100 that are engulfed (immersed) in fluid as the one or more fluid fronts flow within the cavity 230. In some embodiments, the camera tracks are mechanical rails or tracks that guide movement of the cameras. In other embodiments, the camera tracks are movement pathways that are traversed via electromechanical movement of the one or more cameras 310 (similar to an X,Y plotter or CNC milling machine). In one particular embodiment, one camera, mounted on a rotating fixture, may be used to capture images of fluid motion from a single location.

The light sources 330 illuminate at least one surface of the LCM pre-form 100 within the cavity 230. Illumination occurs due to the transparent portion of the mold 200, which in the depicted embodiment is the cover portion 220 of the mold 200. In some embodiments, the fluid pumped into the mold comprises a fluorescent dye and the light source 330 is selected to emit wavelengths that cause the fluorescent dye to fluoresce. For example, the pumped fluid may be a solution of oil and an oil-based fluorescent dye which is sensitive to an ultraviolet light source such as "black light" fluorescent tubes mounted on the lighting platform 340.

In the depicted embodiment, the camera movement platform 320 and the lighting platform 340 are affixed to each other. Furthermore, the camera movement platform 320 and the lighting platform 340 can be raised relative to the mold 200 to enable insertion of the LCM pre-form 100 within the cavity 230. The depicted camera movement platform 320 and lighting platform 340 can also be lowered relative to the mold 200 to enable the capture of images by the cameras 310 as fluid is pumped into the cavity 230 and propagates within the cavity 230. The movement of the cameras may be controlled by one or more control processors (not shown) associated with the in-situ data acquisition system 300 and track one or more wave-fronts of the fluid. Similarly, the (manual or automated) analysis of the images provided by cameras 310 may be conducted using one or more processors. For example, control of the cameras 310 and analysis of the images may be conducted by the computer 500 (depicted in FIG. 5) or the like.

Figure 4:
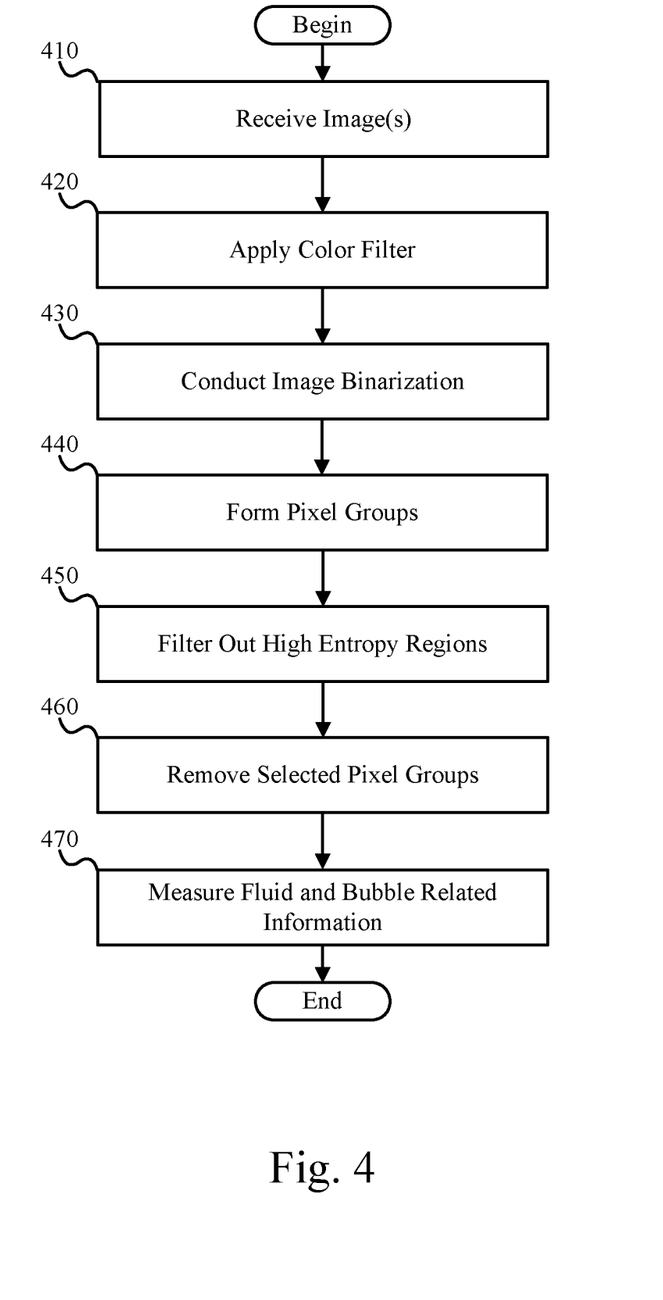
FIG. 4 is a flowchart of one example of a data processing method in accordance with at least one embodiment disclosed herein.

FIG. 4 is a flowchart of one example of a data processing method 400 in accordance with at least one embodiment disclosed herein. As depicted, the data processing method 400 includes receiving (410) one or more images, applying (420) a color filter, conducting (430) image binarization, forming (440) pixel groups, filtering out (450) high entropy regions, removing (460) selected pixel groups and measuring (470) fluid and bubble related information. The data processing method 400 enables determining fluid and bubble related information for LCM processes.

Receiving (410) one or more images may include receiving images captured by the in-situ data acquisition system 300. The images may capture fluid wave-fronts for a fluid injected into a cavity of a liquid composite mold such as the cavity 230 of the mold 200. Applying (420) a color filter may include applying a green filter to maximize the contrast between the UV light source and the LCM pre-form. In some embodiments, applying a green filter is accomplished by dropping the red and blue channels of an RGB color encoding scheme.

Conducting (430) image binarization may include selecting a brightness threshold and assigning pixels a "1" or "white" value that meet or exceed that threshold and a "0" or "black" value to pixels less than the threshold value. Forming (440) pixel groups may include clustering adjacent pixels that have the same value. Filtering out (450) high entropy regions may include removing regions from consideration that are limited to small pixel groups.

Removing (460) selected pixel groups may include removing pixels groups that have a large aspect ratio and/or are closely aligned with a fiber orientation of the LCM pre-form. Measuring (470) fluid and bubble related information may include making measurements on the remaining pixel groups that have a common selected value. For example, measurements may be made on "white" pixel groups. Furthermore, measurements can be made on the movement of such pixel groups from frame to frame.

One of skill in the art will appreciate that the above described means and methods for image capture and processing enable determining fluid information and bubble information for liquid composite molding processes. Examples of fluid information include fluid front information, fluid velocity information and fluid viscosity information. Examples of bubble information include bubble size information, bubble location information, bubble count information, bubble volume fraction information, bubble displacement information, bubble velocity information, bubble migration information, spatial distribution information, bubble orientation information, bubble aspect ratio information, and nearest neighbor distance information.

Figure 5:
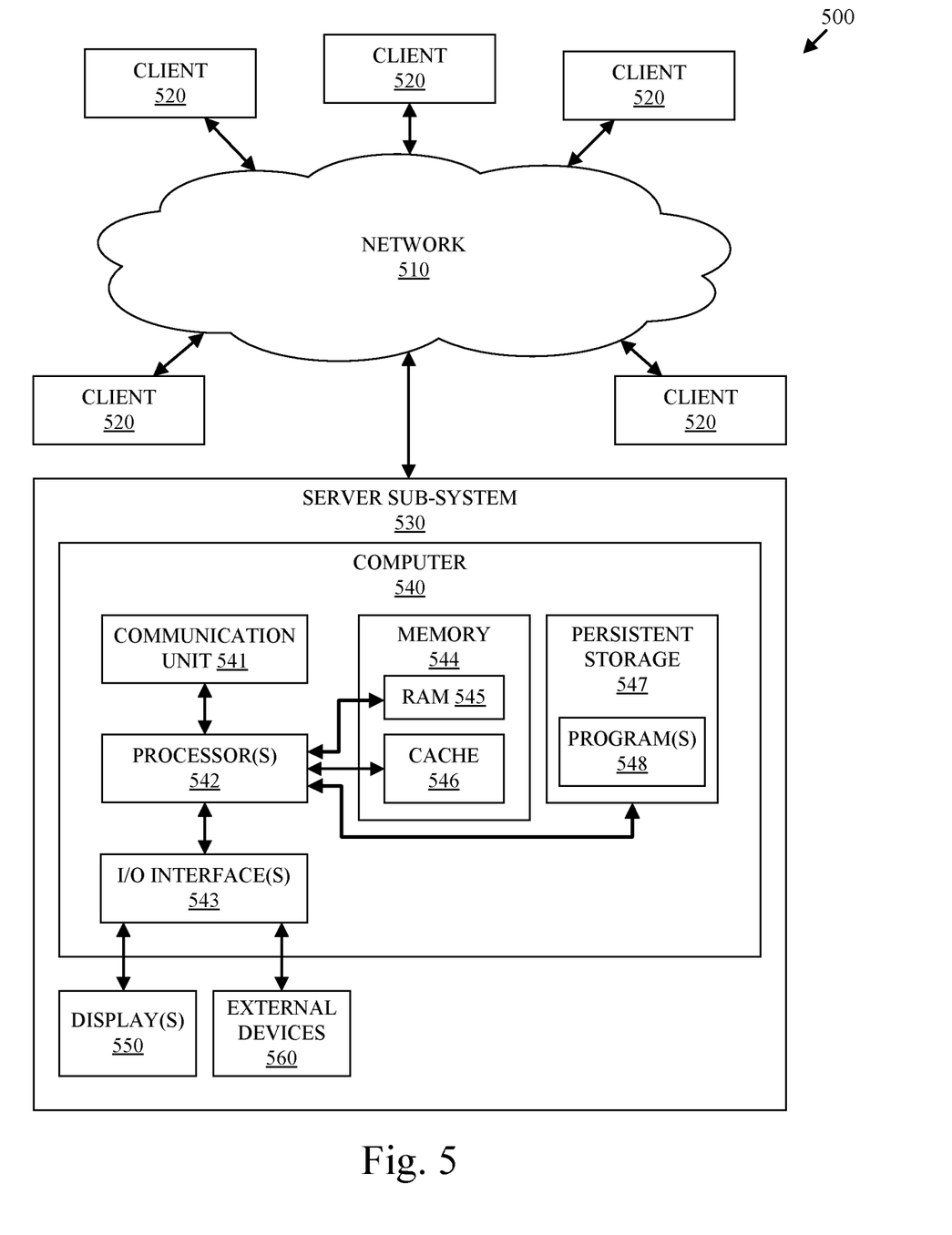
FIG. 5 is a block diagram illustrating various portions of a computing environment in accordance with at least one embodiment disclosed herein.

FIG. 5 is a block diagram illustrating various portions of a computing system 500 in accordance with at least one embodiment disclosed herein. The computing system 500 is one example of a computing system that may be leveraged to conduct the methods disclosed herein. As depicted, computing system 500 includes a communication network 510, one or more client devices 520, and at least one server subsystem 530. The depicted server subsystem 530 includes at least one computer 540 connected to one or more displays 550 and one or more external devices 550. The depicted computer 540 includes a communication unit 541, one or more processors 542, a set of I/O interfaces 543, memory 544, including random access (i.e., main) memory 545 and cache memory 546, and persistent storage 547 that stores one or more programs or executables 548.

Similar to the depicted subsystem 530, the clients 520 may comprise a computer 540. Subsystem 530 and computer 540 are, in many respects, representative of the subsystems and devices that can execute at least a portion of one or more methods disclosed herein. Accordingly, several portions of subsystem 530 and computer 540 will now be discussed in the following paragraphs.

Computer 540 may be a laptop computer, tablet computer, netbook computer, personal computer (PC), desktop computer, personal digital assistant (PDA), smart phone, or any programmable electronic device capable of communicating via network 510. Each executable 548 is a collection of machine readable instructions and/or data that is used to perform at least some of the software functions discussed herein. For example, the methods describe herein may correspond to one or more executables 548.

Computer 540 is capable of communicating with other computing devices, such as the clients 520 and other subsystems 530, via communication network 510. Communication network 510 can be, for example, a local area network (LAN), a wide area network (WAN) such as the Internet, or a combination of the two, and can include wired, wireless, or fiber optic connections. In general, communication network 510 can be any combination of connections and protocols that will support communications between computing devices such as the server subsystem and client subsystems.

Computer 540 is shown as a block diagram with many double arrows. These double arrows (no separate reference numerals) represent a communications fabric, which provides communications between various components of computer 540. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 544 and persistent storage 547 are computer-readable storage media. In general, memory 544 can include any suitable volatile or non-volatile computer-readable storage media. It is further noted that, now and/or in the near future: (i) external device(s) 560 may be able to supply some or all memory for subsystem 530; and/or (ii) devices external to subsystem 530 may be able to provide memory for subsystem 530.

The programs 548 are stored in persistent storage 547 for access and/or execution by one or more of the respective computer processors 542, usually through one or more memories of memory 544. Persistent storage 547: (i) is at least more persistent than a signal in transit; (ii) stores the programs (including its soft logic and/or data) on a tangible medium (such as magnetic or optical domains); and (iii) may be substantially less persistent than permanent storage. Alternatively, data storage may be more persistent and/or permanent than the type of storage provided by persistent storage 547.

Programs 548 may include both machine readable and performable instructions, and/or substantive data (e.g., the type of data stored in a database). In one particular embodiment, persistent storage 547 includes a magnetic hard disk drive. To name some possible variations, persistent storage 547 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 547 may also be removable. For example, a removable hard drive may be used for persistent storage 547. Other examples include optical and magnetic disks, thumb drives, and smart cards that are inserted into a drive for transfer onto another computer-readable storage medium that is also part of persistent storage 547.

Communications unit 541 in the depicted example provides for communications with other data processing systems or devices external to subsystem 520. In these examples, communications unit 541 includes one or more network interface cards. Communications unit 541 may provide communications through the use of either, or both, physical and wireless communications links. Any software modules discussed herein may be downloaded to a persistent storage device (such as persistent storage device 560) through a communications unit (such as communications unit 541).

I/O interface set 543 allows for input and output of data with other devices that may be connected locally in data communication with computer 540. For example, I/O interface set 543 provides a connection to external device set 560. External device set 560 will typically include devices such as a keyboard, keypad, touch screen, and/or some other suitable input device. External device set 560 can also include portable computer-readable storage media such as, for example, thumb drives, portable optical or magnetic disks, and memory cards. Software and data used to practice embodiments of the present invention, for example, programs 548, can be stored on such portable computer-readable storage media. In these embodiments the relevant software may (or may not) be loaded, in whole or in part, onto persistent storage device 560 via I/O interface set 543. I/O interface set 543 also connects in data communication with display device 550. Display device 550 provides a mechanism to display data to a user and may be, for example, a computer monitor or a smart phone display screen.

The features, advantages, and characteristics of the embodiments described herein may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA), may execute the computer-readable program instructions by utilizing state information of the computer-readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus, or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional units described in this specification may have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

In the preceding description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements. The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for in-situ data acquisition, the method comprising:
   providing a mold, wherein at least a portion of the mold is transparent;
   inserting a liquid composite molding reinforcement into a cavity of the mold;
   injecting a fluid into the cavity of the mold, the fluid comprising a fluorescent dye;
   lighting the mold with an ultraviolet lighting source; and
   capturing a plurality of images of a leading edge of the fluid as the fluid advances within the cavity of the mold, wherein capturing the plurality of images of the leading edge of the fluid comprises advancing a camera along a camera track as the fluid advances within the cavity of the mold.

2. The method of claim 1, further comprising processing one or more images of the plurality of images to determine bubble information for the fluid.

3. The method of claim 2, wherein the bubble information comprises one or more of bubble size information, bubble location information, bubble count information, bubble volume fraction information, bubble displacement information, bubble velocity information, bubble migration information, spatial distribution information, bubble orientation information, bubble aspect ratio information, and nearest neighbor distance information.

4. The method of claim 2, wherein processing the one or more images of the plurality of images comprises applying a green filter to the one or more images of the plurality of images.

5. The method of claim 4, wherein applying the green filter comprises excluding one or more color channels.

6. The method of claim 2, wherein processing the one or more images of the plurality of images comprises binarization of the one or more images of the plurality of images.

7. The method of claim 6, wherein processing the one or more images of the plurality of images comprises grouping adjacent binary pixels having a common value to produce pixel groups.

8. The method of claim 7, wherein processing the one or more images of the plurality of images comprises filtering, or sorting, the pixel groups according to size.

9. The method of claim 7, wherein processing the one or more images of the plurality of images comprises filtering out pixel groups that have a selected orientation range.

10. The method of claim 9, wherein the selected orientation range corresponds to a fiber orientation for the liquid composite molding reinforcement.

11. The method of claim 7, wherein processing the one or more images of the plurality of images comprises filtering out pixel groups that have an aspect ratio that is greater than a selected ratio.

12. The method of claim 11, wherein the selected ratio is 85 to 1.

13. The method of claim 2, wherein processing the one or more images of the plurality of images comprises filtering out regions that have higher entropy than neighboring regions.

14. The method of claim 1, further comprising processing one or more images of the plurality of images to determine fluid information.

15. The method of claim 14, wherein the fluid information comprises one or more of fluid front information, fluid velocity information and fluid viscosity information.

16. A method for in-situ data acquisition, the method comprising:
    providing a mold, wherein at least a portion of the mold is transparent;
    inserting a liquid composite molding reinforcement into a cavity of the mold;
    injecting a fluid into the cavity of the mold, the fluid comprising a fluorescent dye;
    lighting the mold with an ultraviolet lighting source;
    capturing a plurality of images of a leading edge of the fluid as the fluid advances within the cavity of the mold, wherein capturing the plurality of images of the leading edge of the fluid comprises advancing a camera along a camera track as the fluid advances within the cavity of the mold; and
    processing one or more images of the plurality of images to determine bubble information for the fluid.

17. The method of claim 16, wherein processing the one or more images of the plurality of images comprises grouping adjacent binary pixels having a common value to produce pixel groups.

18. The method of claim 17, wherein processing the one or more images of the plurality of images comprises filtering out pixel groups that have a selected orientation range corresponding to a fiber orientation for the liquid composite molding reinforcement.

19. The method of claim 17, wherein processing the one or more images of the plurality of images comprises filtering out pixel groups that have an aspect ratio that is greater than a selected ratio.

20. A computer program product for in-situ data acquisition, the computer program product comprising a computer readable storage medium having program instructions embodied therewith, wherein the computer readable storage medium is not a transitory signal per se, the program instructions executable by a processor to cause the processor to conduct a method comprising:
    providing a mold, wherein at least a portion of the mold is transparent;
    inserting a liquid composite molding reinforcement into a cavity of the mold;
    injecting a fluid into the cavity of the mold, the fluid comprising a fluorescent dye;
    lighting the mold with an ultraviolet lighting source;
    capturing a plurality of images of a leading edge of the fluid as the fluid advances within the cavity of the mold, wherein capturing the plurality of images of the leading edge of the fluid comprises advancing a camera along a camera track as the fluid advances within the cavity of the mold;
    processing one or more images of the plurality of images to determine bubble information for the fluid;
    wherein processing the one or more images of the plurality of images comprises grouping adjacent binary pixels having a common value to produce pixel groups;
    wherein processing the one or more images of the plurality of images comprises filtering out pixel groups that have a selected orientation range corresponding to a fiber orientation for the liquid composite molding reinforcement; and
    wherein processing the one or more images of the plurality of images comprises filtering out pixel groups that have an aspect ratio that is greater than a selected ratio.

* * * * *